United States Patent [19]

Byers et al.

[11] Patent Number: 4,926,313
[45] Date of Patent: May 15, 1990

[54] BIFURCATED REGISTER PRIORITY SYSTEM

[75] Inventors: Larry L. Byers, Apple Valley; Howard A. Koehler, Minneapolis; Wayne A. Michaelson, Circle Pines, all of Minn.

[73] Assignee: Unisys Corporation, Blue Bell, Pa.

[21] Appl. No.: 246,510

[22] Filed: Sep. 19, 1988

[51] Int. Cl.$^5$ .............................................. G06F 13/34
[52] U.S. Cl. .................................... 364/200; 364/241.2
[58] Field of Search ... 364/200 MS File, 900 MS File, 364/300

[56] References Cited

U.S. PATENT DOCUMENTS

| | | |
|---|---|---|
| 3,353,160 | 11/1967 | Lindquist . |
| 3,399,384 | 8/1968 | Crockett et al. ...................... 364/200 |
| 3,425,037 | 1/1969 | Patterson et al. ..................... 364/200 |
| 3,434,111 | 3/1969 | Schmidt et al. ....................... 364/200 |
| 3,473,155 | 10/1969 | Couleur et al. ....................... 364/200 |
| 3,534,339 | 10/1970 | Rosenblatt ............................ 364/200 |
| 3,629,854 | 12/1971 | Hauck .................................... 364/200 |
| 3,643,229 | 2/1972 | Stuebe et al. ......................... 364/200 |
| 3,676,860 | 7/1972 | Collier et al. ........................ 364/200 |
| 3,710,351 | 1/1973 | Nakamura ............................ 364/200 |
| 3,742,148 | 6/1973 | Ledeen et al. ........................ 364/200 |
| 3,752,932 | 8/1973 | Frisone .................................. 370/90 |
| 3,832,692 | 8/1974 | Henzel et al. ........................ 364/200 |
| 4,380,798 | 4/1985 | Shannon et al. ..................... 364/200 |
| 4,455,602 | 6/1984 | Baxter et al. ......................... 364/200 |
| 4,745,548 | 5/1988 | Blahut .................................. 364/200 |
| 4,760,515 | 7/1988 | Malmquist et al. ................. 364/200 |

Primary Examiner—David Y. Eng
Attorney, Agent, or Firm—Frederick W. Niebuhr; Glenn W. Bowen; Robert S. Bramson

[57] ABSTRACT

A dual priority hold register enables the transfer of data to memory ports having serial priority in accordance with two stages of priority. First, all latches of a high priority sector of the register are cleared. Then, the highest priority latch of the low priority sector of the register is cleared, while the latches of the higher priority register are loaded with further data. Following clearance of the low priority latch, all latches of the higher priority register are cleared once again, followed by clearance of the next highest priority latch of the lower priority register sector while the higher priority register is loaded once again. The sequence is repeated until both the higher and lower priority sectors of the register are clear.

9 Claims, 4 Drawing Sheets

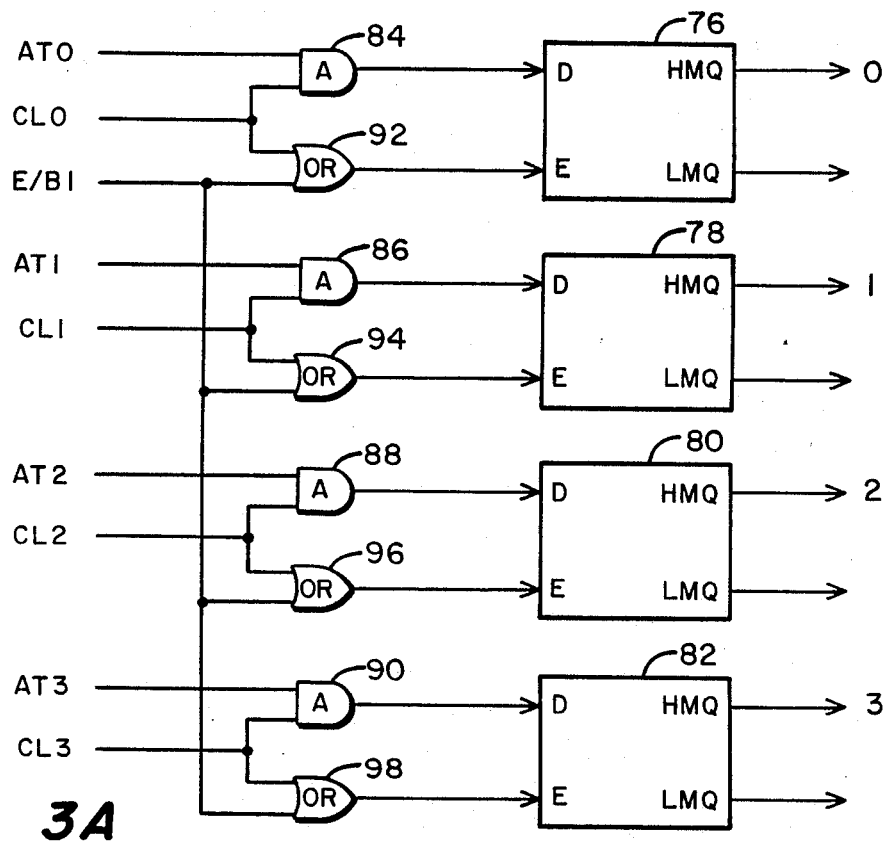
_Fig. 3A_
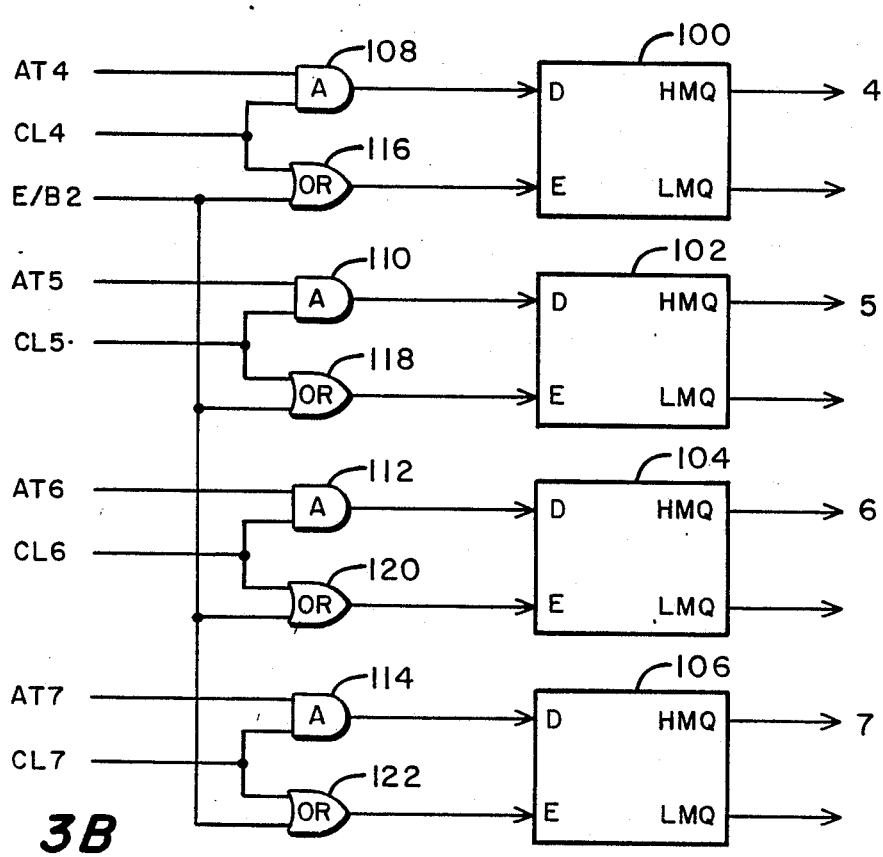
_Fig. 3B_

BIFURCATED REGISTER PRIORITY SYSTEM

BACKGROUND OF THE INVENTION

This invention relates to systems for processing data, and more particularly to means for determining the priority among a plurality of sources contending to provide data to a common, shared data bus.

It is a well known and frequently employed technique in data processing to connect a plurality of sources of data to a single channel or bus adapted to receive data from all of the sources. For example, two or more disc drives, tape drives, or the like can be joined in this manner to a single central processing unit through a plurality of input/output processors. In addition, a plurality of CPU's or instruction processors may provide additional sources of data to the common channel and thus contend for its use along with the input/output processors. The instruction processors typically contain programs including commands, instructions and routines stored in the CPU to direct operation of the data handling system. This multiple source contention for a single bus or channel gives rise to the need to distinguish and to determine priority among the competing sources.

One time honored approach is to assign individual, sequential priority. For example, U.S. Pat. No. 3,534,339 (Rosenblatt) discloses a system which encodes identification bits of multiple active devices simultaneously, and selects the identification bits corresponding to a request signal from the highest priority device. Similarly, in U.S. Pat. No. 3,425,037 (Patterson), signals from all peripheral devices sharing a common connection are monitored, with a request signal from each inhibited if the monitoring means senses a higher priority request. Other directly sequential priority systems are disclosed in U.S. Pat. No. 4,745,548 (Blahut) and U.S. Pat. No. 3,353,160 (Lindquist).

Alternatively, priority may be determined by sensing less than all of the sources. For example, U.S. Pat. No. 3,832,692 (Henzel) discloses a plurality of priority seeking devices sharing a common bus. Each device "looks back" in the sense of determining the priority indications of two or more previous (higher priority) devices, and thus gains access to the bus only if the previous two or more devices are not requesting such access.

Yet another technique is to determine priority by enabling data sources to interrupt access of lower priority sources sharing the channel. In U.S. Pat. No. 3,643,229 (Stuebe), a series of stored programs including commands, instructions and routines, can individually interrogate the CPU memory and retrieve addresses of command sequences. An interrupt arrangement allows the CPU to interrupt a program being executed and shift to and execute a higher priority command sequence, returning to the original program after such execution. U.S. Pat. No. 3,473,155 (Couleur) discloses a somewhat similar system for determining priority among peripheral units.

The aforementioned sequential systems, however, tend to over-utilize the sources of highest priority and under-utilize the lowest priority sources. This disadvantage can be limited by limiting the number of separate sources sharing the common channel, or by employing additional circuitry or logic to counter the imbalance. For example, U.S. Pat. No. 3,676,860 (Collier) discloses a system in which competing processors each have a request phase and a control phase, with a priority system determining which among several processors can move from the request to the control phase. A register which determines priorities is modified each time a connection is established by one of the processors. In U.S. Pat. No. 3,399,384 (Crockett), each of a plurality of peripheral devices can issue demand signals of differing priorities. Consequently, final priority is determined by the level of the request, and by a pre-assigned priority among the peripheral devices.

Typically, input/output data must be handled rapidly and virtually as soon as it is presented, while data from instruction processors can be maintained for later use. One known approach is to use a timer to control clearing of a register having high and low priority sectors. The timer sets a predetermined period during which, as long as the high priority sector is being serviced, prevents the low priority sector from being cleared, then permits a shift to the low priority register for a single clearance while the timer is reset. While each of the above systems can be somewhat satisfactorily employed in setting priorities among data sources, none is directed to establishing a general, higher priority for sources of input/output data as opposed to other CPU's, to adequately handle input from other CPU's without requiring a timer.

Therefore, it is an object of the present invention to provide a means for assigning a higher priority to input/output data, for facilitating a more immediate and rapid handling of such data as opposed to data from instruction processors.

Another object is to provide a simple and reliable priority system which, in cooperation with a sequential priority system, designates input/output data for more rapid and immediate handling as opposed to internal processing instructions.

Yet another object of the invention is to provide a bifurcated register means, including a sector for input/output data and a sector for processing instructions, each with multiple latches, and a means for clearing the first sector of the register each time a single latch is cleared from the second sector.

SUMMARY OF THE INVENTION

To achieve these and other objects, there is provided a process for determining priority for data transferred from a plurality of sources, including the following steps:

(a) loading data from a plurality of first priority sources and second priority sources into a register means having a first priority register including a plurality of first priority data latches for receiving data from the first priority sources, and a second priority register including a plurality of second priority data latches for receiving data from the second priority sources;

(b) initiating a first serial transfer of data from the first priority register and continuing the first serial transfer until all of the data has been cleared from the first priority register;

(c) after clearing the first priority register, initiating a second serial transfer of data from the second priority register, continuing the second serial transfer for a selected amount of time to clear one of the second priority data latches, and enabling the first priority register to receive further data from the first priority sources;

(d) following the second serial data transfer, reinitiating initiating the first serial data transfer and, to the extent that further data from the first priority sources is present in the first register, continuing the first serial transfer until all of the data has been cleared from the first priority register;

(e) re-initiating the second serial data transfer after clearing the first priority register, to clear another one of the second priority data latches in the second priority register, and enabling the first priority register to receive further data from the first priority sources; and (f) repeating steps (d) and (e) until all of the second latches have been cleared, thereby to enable the first priority and second priority registers to receive further data from the first and second priority sources, respectively.

Preferably, an individual latch priority is established among all latches including the first latches and second latches, and the first and second serial transfers are conducted in accordance with the individual latch priority.

The process can be implemented by an apparatus for receiving data from a plurality of sources including first priority sources and second priority sources, and for transferring the data at different rates corresponding to the differing priorities. For example, a register means can include a first priority register of four first priority data latches, and a second priority register including four second priority data latches. The first priority sector receives data from first priority sources, for example input/output processors associated with input/output sources such as disc drives or tape drives. Each of the second priority latches can receive data from an associated instruction processor.

The latches are cleared, first in accordance with a system assigning individual priority throughout the register means, in which all of the first priority latches have a higher priority than any of the second priority latches. A means is provided for initiating the second serial transfer of data from the four second priority latches, following the clearing of the first priority latches.

A first priority blocking means inhibits the loading of data into any of the first priority latches until data has cleared from all four first priority latches and from one of the second priority latches. A second priority blocking means inhibits the loading of data into any of the second priority latches until all of the second priority latches have been cleared.

Thus, data is cleared from all four higher priority registers, data is cleared from one of the lower priority registers while the higher priority registers are loaded with further data, the subsequently loaded data is cleared from all of the higher priority latches, another of the lower priority latches is cleared, and so on until the full register means is cleared, whereupon all latches may again receive data from the higher and lower priority sources. In the configuration including four first priority latches and four second priority latches, four bits of input/output data are transferred for every bit of instructional processor data, assuming all sources are providing data to the channel or bus. Substantially more time is allotted to the higher priority sources, eliminating tape overruns on input/output requests, and allowing lower priority requestors without the use of a timer.

Thus, in accordance with the present invention a simple, low-cost and reliable means is provided for distinguishing between input/output data and instructional processor output, and for handling the input/output data with the desired, substantially higher priority.

IN THE DRAWINGS

The above and other features and advantages are more readily appreciated upon consideration of the following detailed description and drawings, in which:

FIGS. 3a-3c illustrate in greater detail the portion of the bank relating to the respective priorities for data from input/output processors and instruction processors.

DETAILED DESCRIPTION OF THE PREFERRED EMBODIMENT

Figure 1:
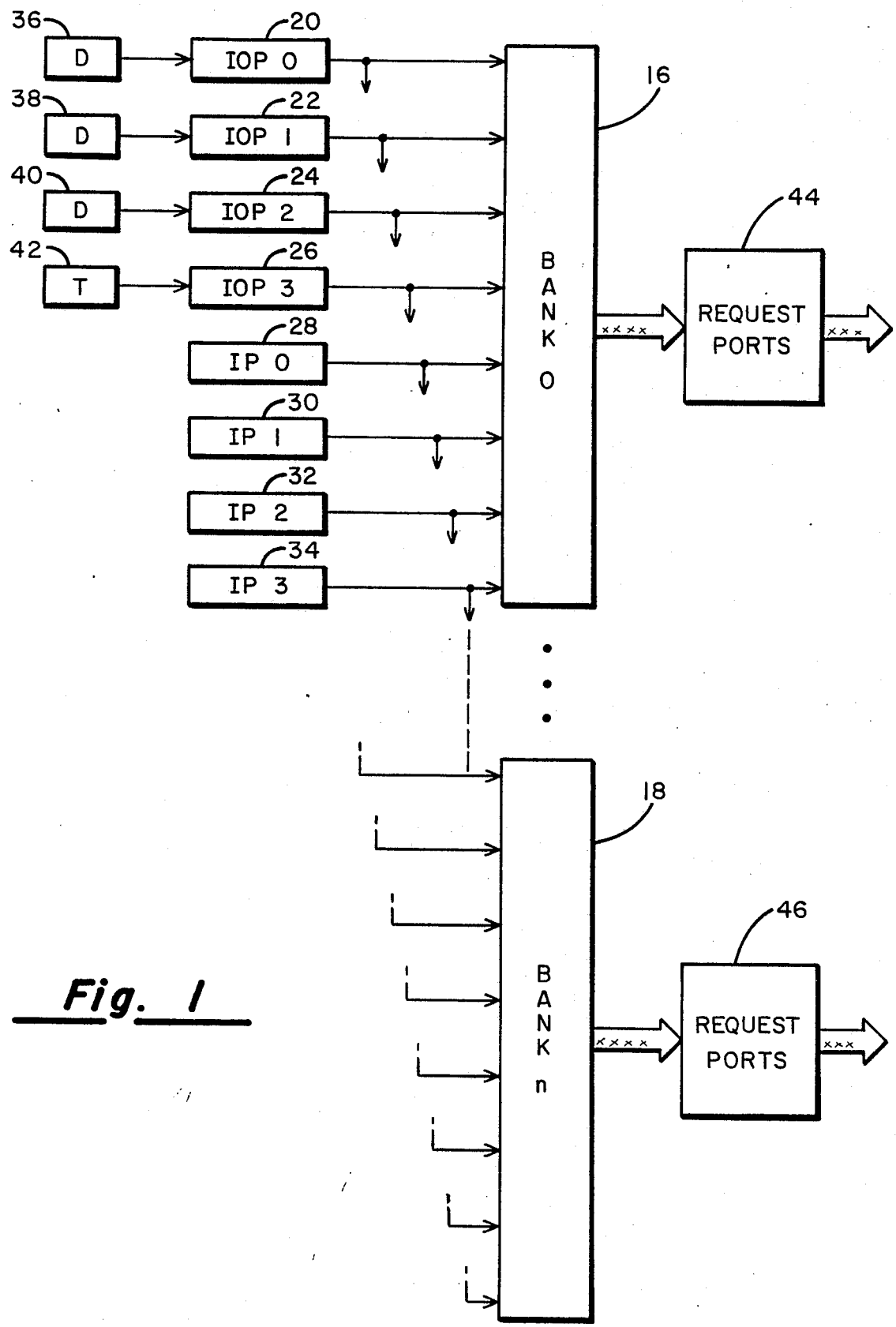
FIG. 1 is a schematic representation of a data handling system including a memory having a plurality of banks, each configured in accordance with the present invention.

Turning now to the drawings, there is shown in FIG. 1 part of a data handling system including a central processing unit (CPU) or instruction processor having a plurality of memory banks, including a bank designated "0" shown at 16, a memory bank designated "n" at 18. Similar, intermediate banks are not shown, but all of the banks interact with each other. Each memory receives data from a plurality of input/output processors 20–26 labeled IOP0, IOP1, IOP2 and IOP3, as well as from a plurality of instruction processors 28–34 designated IP0, IP1, IP2 and IP3.

Each of the input/output processors is connected with a peripheral storage device outside of the CPU. In particular, disc drives 36, 38 and 40 provide data to processors IOP0, IOP1 and IOP2, respectively. Processor IOP3 receives data from a tape drive 42. Additional instruction processors 28–34 are provided for executing commands or subroutines in the course of performing various operations on data from the tape drive or disc drives.

Figure 2:
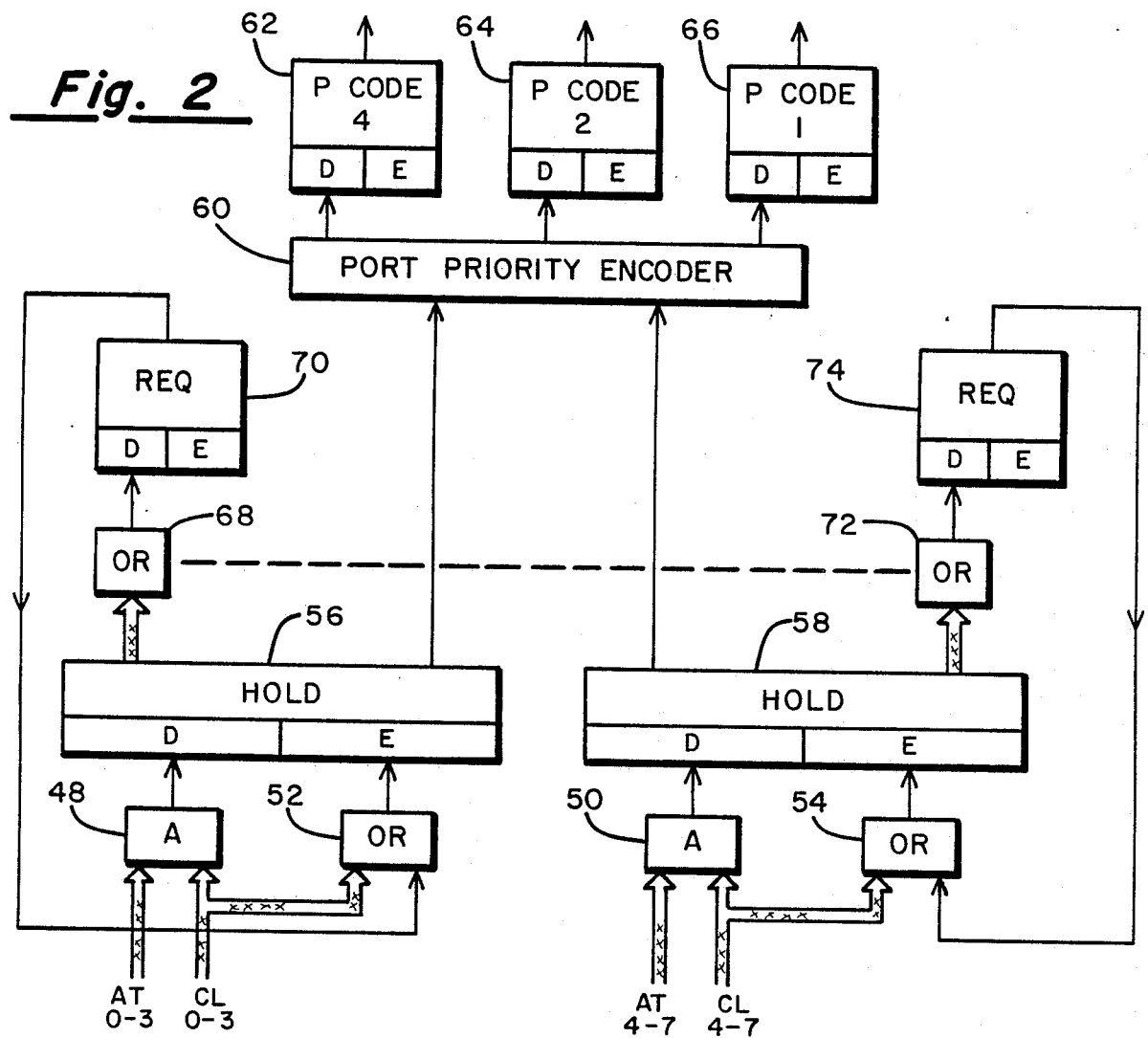
FIG. 2 is a more detailed schematic of a portion of one of the memory banks relating to the determination of address information for data entering the bank.

Thus, it is seen that a portion of bank 16 must provide a common data bus or channel to receive the output of the instruction processors and input/output processors and transfer data to request ports at 44; likewise, to ports 46 for bank 18. As indicated schematically by the downwardly pointing arrows in connection with processors 20–34, each processor can provide its output to any one of the memory banks. Data is apportioned among the banks in accordance with an address decoding scheme not specifically related to the present invention. In FIG. 2, the outputs of the four input/output processors are represented as address translation inputs AT0–AT3, provided to an AND logic means 48, which also receives clearing logic signals labeled CL0–CL3. In similar fashion, the instruction processor outputs are provided to an AND logic means 50 in the form of address translation inputs AT4–AT7. Corresponding clearing logic signals CL4–CL7 are provided to logic means 50 as well.

Address translation inputs AT0–AT7 are control signals used in determining whether bank 16, bank 18, or one of the intermediate memory banks is to receive the incoming data. Clearing logic signals CL0–CL7 are determined in accordance with a priority code assigning a separate, individual priority to each of the eight clearing logic inputs. The clearing logic inputs also are provided to OR gate means, in particular inputs CL0–CL3 are provided to an OR logic means 52, and inputs CL4–CL7 are provided to an OR logic means 54.

The outputs of AND logic means 48 are provided to the data inputs of a bifurcated register including a high priority hold sector or register 56, while the outputs of OR logic means 52 are provided to the enabling inputs of the hold register. Similarly, a low priority hold sector or register 58 of the bifurcated register receives the output of AND logic means 50 at its data inputs, and the outputs of OR logic means 54 at its enable inputs.

The output of hold registers 56 and 58 is provided to a port priority encoder 60, which in turn provides the inputs to the data terminals of three priority code latches at 62, 64 and 66 for determining priority among eight bits by assigning the appropriate bit in the "4" position, "2" position and "1" position, respectively, for the appropriate clearing logic signal. Each of clearing logic signals CL0–CL7 includes a one cycle wide clearing pulse controlled by the priority code. The specific manner of determining individual priority is known in the art and therefore not discussed in further detail. Clearing logic signals CL0–CL7, are used to control sequential clearing of data from hold registers 56 and 58 in accordance with the assigned individual signal priority. Signals AT0–AT8 are bank priority signals, reflecting a determination that bank 16 has been selected, as opposed to the remaining banks in the memory.

An OR logic means 68 receives the output of high priority hold register 56, and based upon that output, provides a signal to the data terminal of a request pending latch 70, either to set or reset the request pending latch. Similarly, an OR logic means 72 receives the output of low priority hold register 58 and provides a signal to the data input of a request pending latch 74, thereby setting or resetting latch 74. The output of latches 70 and 74 is provided respectively to OR logic means 52 and 54, as is explained in greater detail in connection with FIGS. 3a–3c.

As seen from FIG. 3a, register 56 is a series of four hold latches indicated at 76, 78, 80 and 82. Similarly, AND logic means 48, and OR logic means 52 comprise multiple logic gates. In particular, AND gates 84–90 and OR gates 92–98 are associated in pairs with hold latches 76–82.

Each AND gate receives its associated one of signals AT0–AT4, which relate to an interbank priority system for selecting bank 16 as opposed to one of the other banks, and thus only generally concern the present invention. For a description of the interbank priority system, reference is made to U.S. Pat. Application Ser. No. 07/246,507, filed concurrently with this application and with the same named inventors. Each of the AND gates further receives its associated one of latch clearing signals CL0 to CL3, which are determined by port priority encoder 60 and priority code latches 62–66. Each of these latch clearing signals is provided, as well, as an input to the associated one of OR gates 92–98. Finally, the output E/B1 of request pending latch 70, for either enabling or blocking hold latches 76–82, is provided to OR gates 92–98.

FIG. 3b shows low priority hold register 58 to include four low priority hold latches 100–106, each receiving the output of an associated pair of an AND gate and an OR gate from AND gates 108–114 and OR gates 116–122. Signals AT4 through AT7, like AT0 through AT3, are bank priority signals. Latch clearing signals CL4 through CL7 are controlled by the priority code through encoder 60 and latches 62–66. Thus, the priority encoder determines a sequential priority for all of the latch clearing signals CL0–CL7, in effect treating high priority register 56 and low priority register 58 as a signal hold register. Signals CL4 through CL7 are provided to their associated AND gates and OR gates. The other input to each of OR gates 116–122 is a signal labeled E/B2 which either enables or disables latches 100–106

Each of high priority hold latches 76–82, and low priority latches 100–106, receives the output of its associated AND gate at its data terminal, and receives the output of its associated OR gate at its enable terminal. Based on its enable input, each of the hold latches generates an output at its terminal labeled "HMQ", providing four outputs 0–3 of high priority register 56, and four outputs labeled 4–7 of the low priority register 58. The output of each hold register labeled "LMQ" is provided to priority encoder 60, and it not further discussed.

Figure 3C:
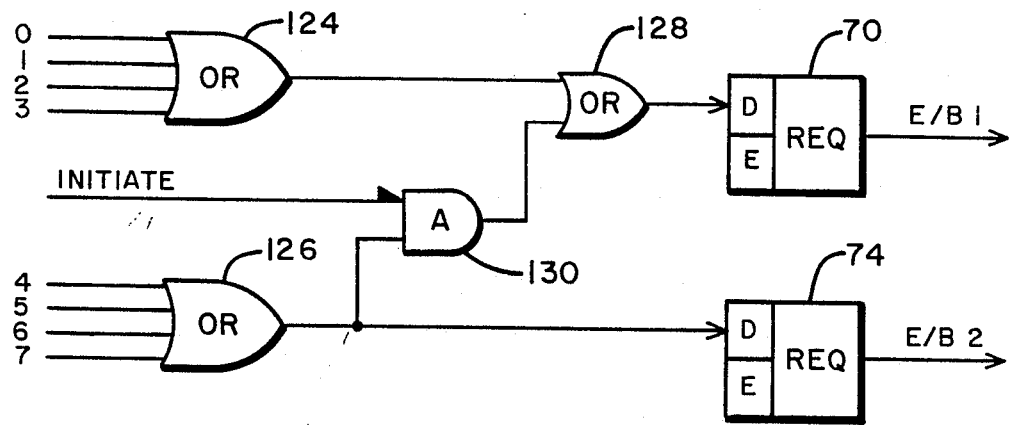

Holding latch outputs 0–7 are provided to a bifurcated register priority system as shown in FIG. 3c for generating the enabling/blocking signals E/B1 and E/B2, based primarily on the presence or absence of data in hold latches 76–82 and 100–106. In particular, the HMQ output of each hold register is high if that register contains data, and low if that register does not contain data. The HMQ outputs 0–3 are provided to an OR gate 124, while similar outputs 4–7 are provided to an OR gate 126. The output of OR gate 124 is provided to the data input terminal of high priority request pending latch 70 through a common OR gate 128.

The output of OR gate 126 is provided directly to the data input terminal of low priority request pending latch 74. This output also is provided as one of the inputs to an AND gate 130, which also receives the inverse of an initiate signal, generated as part of the aforementioned bank priority system. The output of AND gate 130 is provided to common OR gate 128, with the output of OR gate 128 provided to request pending latch 70.

Figure 4A:
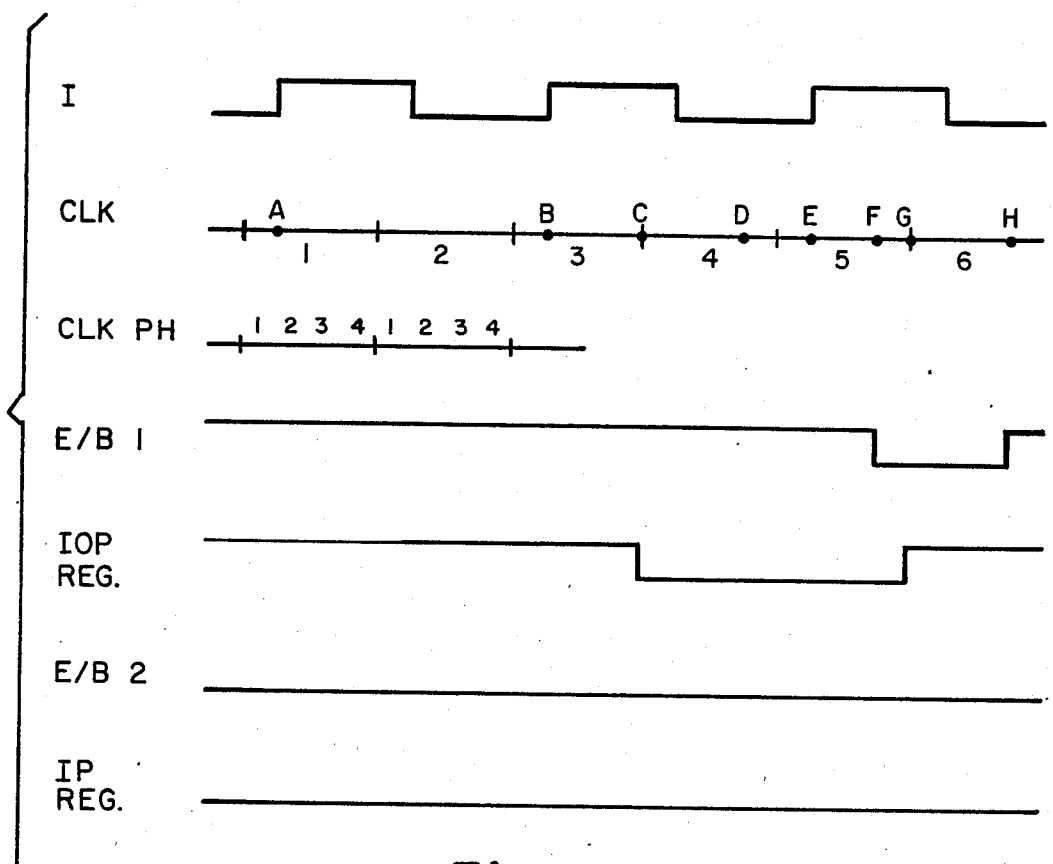
FIGS. 4a and 4b are a timing diagram illustrating the operation of the priority determining portion of the bank.
Figure 4B:
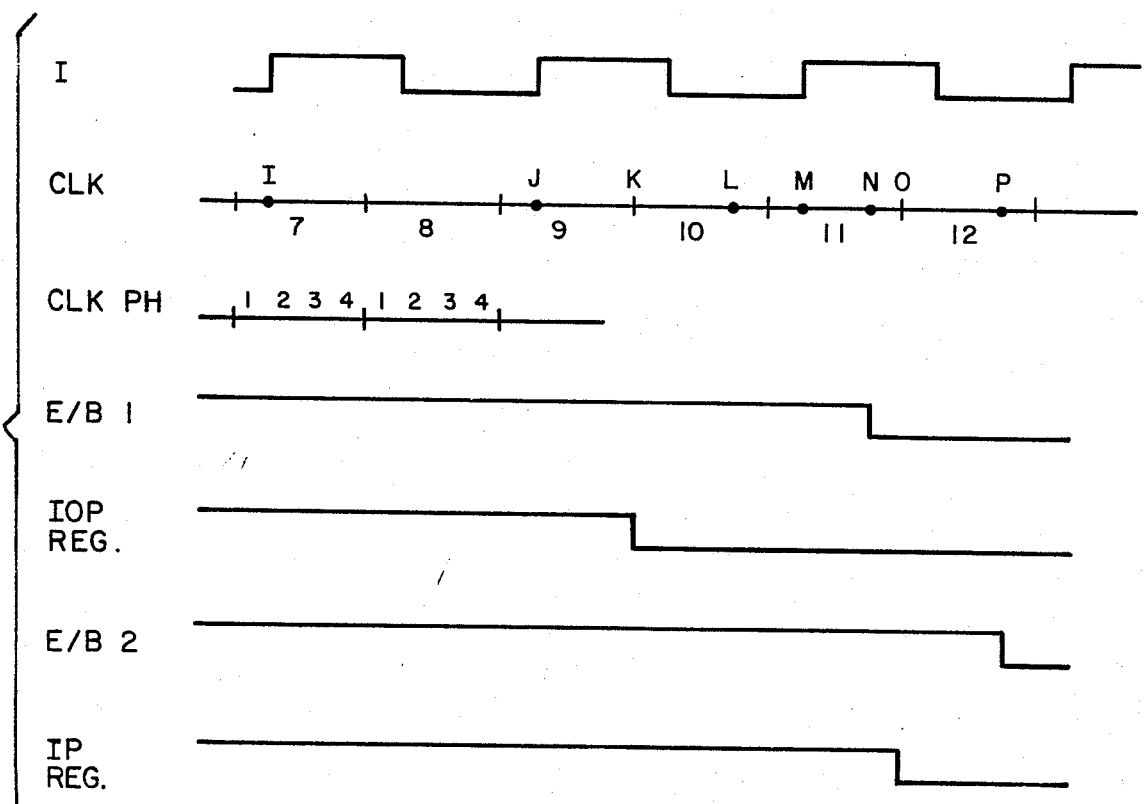

The operation of the divided register priority system is perhaps best understood in connection with the timing diagrams of FIGS. 4a and 4b. The clock is shown with consecutive cycles, each having four phases. The initiate signal, labeled I in the figure, is a one-shot pulse of one cycle duration, beginning at the second phase of the clock cycle, which indicates the start of the servicing of a single data request. The first such event is shown at point "A" on the clock line. The signals labeled E/B1 and E/B2 are the outputs of request pending latches 70 and 74, respectively. Finally, the signals labeled IOP REG and IP REG are the output of OR gates 124 and 126, respectively.

At point A in the diagram, it is assumed that data is contained in both high priority hold register 56 and low priority hold register 58. A set bit in either register represents a request from one of ports 44 corresponding to the particular hold latches, there being eight ports associated with the eight latches. With the clock running, request pending latches 70 and 74 will have been set on phase 4 of the initial clock cycle, and thus are in the set or high condition. All latches in the high and low priority registers are scanned as if part of a single eight-bit register, with the IOP register, i.e. hold register 56, having the highest priority.

The process begins by servicing requests, one at a time, in accordance with the priority as determined by the priority code. In other words, point A represents servicing the highest priority bit in high priority register 56, i.e. by clearing the appropriate one of high priority latches 76–82. Thus, bits are cleared in succession from high priority register 56, at the second phase of every other clock cycle as determined by the shift in the initiate signal (I) to the high level. So long as data remains in any of latches 76–82, the output of OR gate 124 is high, the output of OR gate 128 is high as well, and thus the output of request pending latch 70, E/B1, is high, providing a blocking signal to hold latches 76–82 through associated OR gates 92–98.

At point B, the last bit is removed from high priority register 56, causing IOP REG, the output of OR gate 124, to go low at point C, the first phase of the fourth clock cycle.

The output of request pending latch 70, however, remains in the high or set condition, rather than shifting to low at point D. This is because at D, the initiate signal remains low and the low priority register contains data. More particularly, the output of OR gate 126 is high, and the inverse of the initiate signal is high, and therefore the output of AND gate 130 is high. This maintains the output of OR gate 128 as high, so that high priority request pending latch 70 remains set.

Accordingly, at point E, scanning in accordance with the priority code identifies, as the highest priority bit, the highest priority bit in low priority register 58, and the corresponding latch of low priority latches 100–106 is cleared. At the fourth phase of the same clock cycle (point F), high priority request pending latch 70 is reset, due to the fact that the initiate signal has gone high once again causing a low output from AND gate 130 and thus a low level output of OR gate 128. With signal E/B1 low, high priority latches 76–82 are enabled to accept further data. The loading of data into any of the high priority hold latches generates a high output of OR gate 124 at point G, the first phase of the sixth clock cycle. High priority latch 70 becomes set at the fourth phase of the same clock cycle, i.e. at point H.

At the second phase of the seventh clock cycle, a bit is serviced from the highest priority hold latch of latches 76–82 which contains data. The final bit is removed from the high priority register at point J. Thus, it is assumed that only two bits were loaded into high priority register 56 during the loading (from point F to point G). It is to be understood that any number of bits up to four could have been loaded at that time.

The output of OR gate 124 becomes low at the first phase of the tenth clock cycle (point K). The high priority request pending latch remains high, however, due to the low condition of signal I at point L, as discussed above in connection with point D. This permits the clearing of another one of low priority latches 100–106 at point M, the second clock phase of the eleventh clock cycle. At point N, high priority request pending latch 70 is reset, due to the high condition of the initiate signal.

At the first phase of the twelfth clock cycle, the output of OR gate 126 goes low, indicating that low priority register 58 has been entirely cleared. Low priority request pending latch 74 accordingly is reset at point P, the fourth phase of the twelfth clock cycle. Then, both the high and low priority registers are clear to accept new data.

Thus, all latches of the high priority register are cleared, the highest priority latch from the low priority register is cleared while the high priority register is reloaded, the high priority register is cleared once again, the next highest priority latch of the low priority register is cleared, and so on until the high priority and low priority registers are cleared.

The input/output data connected with disc drives 36–40 and tape drive 42 receives higher priority. In particular, assuming steady requests to all latches of registers 56 and 58, the high priority register is cleared four times for each clearance of the low priority hold register. Of course, it is within the contemplated scope of the present invention to provide high priority and low priority registers of a comparative size corresponding to anticipated needs in particular systems, i.e. in a system demanding a higher priority for input/output data as compared to instructions, the size of the high priority register can be expanded to include five or more latches. Likewise, the relative size of the high priority register may be reduced for a correspondingly higher priority for instructions. Further, it is to be appreciated that the higher and lower priorities need not correspond respectively to input/output data and process instruction. Virtually any need to set more than one priority for more than one set of incoming data sources can be met with a register divided in accordance with the present invention.

What is claimed is:

1. A process for determining priority for data transferred from a source to a plurality of ports for receiving the data, including the steps of:
   (a) loading data from a plurality of first priority sources and second priority sources into a register means having a first priority register including a plurality of first priority data latches for receiving data from said first priority sources, and a second priority register including a plurality of second priority data latches for receiving data from said second priority sources;
   (b) initiating a first serial transfer of data from said first priority register and continuing the first serial transfer until all of the data has been transferred from said first priority register;
   (c) after clearing said first data latches, initiating a second serial transfer of data from said second priority latches to said ports, continuing said second serial transfer for a selected amount of time to clear one of the second priority data latches, and enabling said first priority register to receive further data from said first priority sources;
   (d) following said second serial data transfer, reinitiating said first serial data transfer and, to the extent that further data from the first priority sources is present in said first register, continuing said first serial transfer until all of said first priority data latches are again clear;
   (e) re-instating said second serial data transfer after again clearing said first priority data latches, to clear another one of said second latches in said second priority register, and enabling said first priority register to receive further data from said first priority sources; and
   (f) repeating steps (d) and (e) until all of said second latches have been cleared, thereby to enable said first priority and second priority registers to receive further data from said first and second sources, respectively.

2. The process of claim 1 wherein:

said first priority register includes four first priority latches and said second priority register includes four second priority latches.

3. The process of claim 2 including the further step of:
setting an individual latch priority among a set of registers comprising all of said first and second latches, and carrying out each of said first and second serial transfers in accordance with said latch priority.

4. The process of claim 1 wherein:
said first and second transfers are conducted in accordance with an individual latch priority scheme assigning a priority for the clearing of each of said first and second latches, with all of said first latches having a higher priority than any of said second latches.

5. An apparatus for receiving data from a plurality of sources including first priority sources and second priority sources, and for transferring the data at different rates corresponding to the differing priorities, including:
a register means having a first priority register including a plurality of first priority data latches, and having a second priority register including a plurality of second priority data latches;
a register loading means for transferring data from said first and second priority sources into said first and second priority registers, respectively;
a first priority initiating means for initiating a first serial transfer of data from said first priority register, and a second priority initiating means for initiating a second serial transfer of data from said second priority register following the clearing of all of said first priority latches, said first priority initiating means inhibiting said second priority initiating means during said first serial transfer;
a first priority blocking means for inhibiting the loading of further data into any of said first priority latches until a clearing of data from all of said first priority latches, and further for a selected period of time after said clearing to transfer data from one of said second priority latches;
a second priority blocking means for inhibiting the loading of data into any of said second priority latches until all of said second priority latches have been cleared.

6. The apparatus of claim 5 wherein said first priority blocking means includes:
a first request pending latch for providing a latch enabling input to an enable terminal of each of said first priority latches, responsive to receiving a first signal indicating that all of said first priority latches have been cleared and further that sufficient time has elapsed following the clearance of all of said first priority latches to permit the clearance of one of said second priority latches.

7. The apparatus of claim 6 wherein:
said second blocking means includes a second priority request pending latch for providing an enabling signal to an enable terminal of each of said second priority latches, responsive to receiving a second signal indicating that all of said second priority latches have been cleared.

8. The apparatus of claim 7 further including:
a first OR logic gate receiving the outputs of all of said first priority data latches, a second OR logic gate receiving the outputs of all of said second priority data latches, an AND logic gate receiving the output of said second OR gate and further receiving a clocking signal having alternating, substantially uniform periods of first and second logic states, with the length of each of said periods corresponding to the time necessary for clearing one of said second priority latches, and a third OR logic gate receiving as inputs the output of said first OR gate and the output of said AND gate;
wherein each of said first and second priority data latches generates said first logic state as its output when it contains data, and said second logic output state when it is clear; and
wherein the output of said third OR logic gate is provided as the input to said first request pending latch, and the output of said second OR gate is provided as the input to said second request pending latch.

9. An apparatus for receiving data from a plurality of sources including first priority sources and second priority sources, and for transferring the data to a series of request ports at rates determined by said first and second priorities, including:
a register means including a first priority register with a plurality of first priority data latches, and a second priority register with a plurality of second priority data latches;
a register loading means for transferring data from said first priority sources into said first priority register and for transferring data from said secondn priority sources into said second priority register;
a priority code means for determining an individual serial priority among said first and second priority data latches, with each of said first priority data latches having a higher priority than any of said second priority data latches;
a serial transfer initiating means for serially transferring data from said register means to said request ports until all data has been cleared from said first priority register, and for clearing data from the highest priority one of said second priority data latches;
a first priority register control means for inhibiting said register loading means from transferring further data from said first priority sources into said first priority register until the clearance of said first priority data latches and said highest priority second priority latch; and
a second priority register control means for inhibiting said register loading means from transferring data from said second priority sources into said second priority register until all of said second latches have been cleared.

* * * * *